(12) United States Patent
Sampath et al.

(10) Patent No.: US 8,891,358 B2
(45) Date of Patent: Nov. 18, 2014

(54) METHOD FOR APPLICATION BROADCAST FORWARDING FOR ROUTERS RUNNING REDUNDANCY PROTOCOLS

(75) Inventors: Rangaprasad Sampath, Bangalore (IN); Venkatavaradhan Devarajan, Bangalore (IN)

(73) Assignee: Hewlett-Packard Development Company, L.P., Houston, TX (US)

( * ) Notice: Subject to any disclaimer, the term of this patent is extended or adjusted under 35 U.S.C. 154(b) by 1347 days.

(21) Appl. No.: 12/574,474

(22) Filed: Oct. 6, 2009

(65) Prior Publication Data
US 2010/0098082 A1 Apr. 22, 2010

(30) Foreign Application Priority Data
Oct. 16, 2008 (IN) .......................... 2541/CHE/2008

(51) Int. Cl.
| | | |
|---|---|---|
| G01R 31/08 | (2006.01) | |
| G06F 11/00 | (2006.01) | |
| G08C 15/00 | (2006.01) | |
| H04J 1/16 | (2006.01) | |
| H04J 3/14 | (2006.01) | |
| H04L 1/00 | (2006.01) | |
| H04L 12/26 | (2006.01) | |
| H04L 12/761 | (2013.01) | |
| H04L 12/701 | (2013.01) | |
| H04L 12/713 | (2013.01) | |
| H04L 29/12 | (2006.01) | |

(52) U.S. Cl.
CPC ............... *H04L 45/00* (2013.01); *H04L 45/16* (2013.01); *H04L 45/586* (2013.01); *H04L 61/2015* (2013.01)
USPC ........... 370/219; 370/216; 370/217; 370/218; 370/220; 370/401

(58) Field of Classification Search
CPC ... H04L 45/00; H04L 61/2015; H04L 45/586; H04L 45/16
See application file for complete search history.

(56) References Cited

U.S. PATENT DOCUMENTS 6,397,260 B1 * 5/2002 Wils et al. ...................... 709/238
7,643,496 B1 * 1/2010 Jamieson et al. ............. 370/400
(Continued)

FOREIGN PATENT DOCUMENTS

JP 2005-341199 * 8/2005 ............. H04L 12/56

OTHER PUBLICATIONS

Hinden, Robert, "Virtual Router Redundancy Protocol (VRRP)," RFC 3768, Apr. 2004.
(Continued)

*Primary Examiner* — Jae Y Lee

(57) ABSTRACT

A method for application broadcast forwarding for routers running redundancy protocols in a network is provided. The network includes a first router running at least one program instance of a redundancy protocol at one interface, and a second router running at least one program instance of the redundancy protocol at one interface. A relay agent is enabled on both the first and second routers. The method includes, for each router, determining at least one preference ID for the router, determining a broadcast ID of each incoming broadcast packet, matching the broadcast ID of the incoming broadcast packet with the at least one preference ID of the router, and relaying the incoming broadcast packet from a first network domain to a second network domain if the broadcast ID of the incoming broadcast packet matches one preference ID of the router.

15 Claims, 6 Drawing Sheets

(56) References Cited

U.S. PATENT DOCUMENTS

| | | | |
|---|---|---|---|
| 8,014,409 B1* | 9/2011 | Pan | 370/401 |
| 2005/0226144 A1* | 10/2005 | Okita | 370/219 |
| 2006/0036733 A1* | 2/2006 | Fujimoto et al. | 709/225 |
| 2006/0209787 A1* | 9/2006 | Okuda | 370/351 |
| 2007/0153808 A1* | 7/2007 | Parker et al. | 370/395.53 |
| 2009/0016215 A1* | 1/2009 | Nadas et al. | 370/230 |
| 2009/0210518 A1* | 8/2009 | Verma et al. | 709/220 |
| 2009/0268607 A1* | 10/2009 | Wang et al. | 370/218 |

OTHER PUBLICATIONS

Wimer, W., "Clarifications and Extensions for the Bootstrap Protocol," RFC 1542, Carnegie Mellon University, Oct. 1993.

Droms, R., "Dynamic Host Configuration Protocol," RFC 2131, Mar. 1997.

* cited by examiner

METHOD FOR APPLICATION BROADCAST FORWARDING FOR ROUTERS RUNNING REDUNDANCY PROTOCOLS

RELATED APPLICATION

This application claims priority to Indian Patent Application No. 2541/CHE/2008, entitled "METHOD FOR APPLICATION BROADCAST FORWARDING FOR ROUTERS RUNNING REDUNDANCY PROTOCOLS", filed on Oct. 16, 2008, which is hereby incorporated by reference in its entirety.

FIELD OF THE INVENTION

This invention relates generally to application broadcast forwarding, and in particular, to a method for application broadcast forwarding for routers running redundancy protocols in a network, to forward broadcast packets from one network domain to another.

BACKGROUND OF THE INVENTION

Enterprise networks are typically organized in clusters of smaller networks or sub-networks for ease of management and scalability. User clients that connect to these sub-networks usually function in a plug-and-play mode where these clients fetch required infrastructure information for network connectivity from dedicated servers in the sub-network the clients are connected to. The clients usually use an interne protocol to identify such dedicated servers and obtain the required infrastructure information. Examples of such protocols include Dynamic Host Configuration Protocol (DHCP) and Time Protocol (TIMEP). In such protocols, the client uses a broadcast discovery mechanism to identify the availability of the dedicated servers in the sub-network.

However, it may not be operationally feasible to dedicate at least one server in each sub-network for the purpose of providing infrastructure information for each clients plugged in to the sub-network. Therefore, such servers usually reside in one particular sub-network, and the routers of other sub-networks employ a technique of application broadcast forwarding (or commonly known as UDP broadcast forwarding) to relay broadcast discovery packets generated by clients in one sub-network to an appropriate dedicated server that resides in another sub-network.

The router in the sub-network that provides the application broadcast forwarding functionality normally also serves as the default gateway for the sub-network to other sub-networks. Hence, if this router fails, the sub-network will be completely cut-off from the entire network. Redundancy protocol is usually used to prevent such network outage caused by a single router. Examples of a redundancy protocol include Virtual Router Redundancy Protocol (VRRP) and Cisco's Hot Standby Routing Protocol (HSRP) where a pair (or more) of routers is used to provide default gateway functionality, so that outage of the sub-network will not occur in the event when one of the routers fails.

When redundancy protocol is used to provide default gateway functionality in the sub-network, some kind of arbitration mechanism is used to ensure that only one router forwards packets for that sub-network. For example, VRRP ensures that only one router respond to Address Resolution Protocol (ARP) requests for a default gateway network address, thus ensuring only one router that will forward requests and hence prevents any possibility of data duplication in the network. As there are multiple routers in the sub-network, different hosts may also be configured with different routers as their default gateway for unicast load balancing purposes.

However when such routers also provide the application broadcast forwarding functionality, there is no arbitration mechanism to dynamically decide which of the routers in the sub-network will relay broadcast packets. Therefore, all the routers will relay the broadcast packets to the sub-network where the dedicated server resides. This results in duplication of packets in the network. The server will also respond to these duplicated packets and send its replies back to the hosts in the sub-network. This results in bandwidth wastage and other operational problems in the network.

A common solution to this is to have only one router of a redundant router pair enabled with the application broadcast forwarding functionality, so that only this router will relay broadcast packets. However the failure of this router will result in clients not being able to discover the dedicated servers despite the availability of other redundant routers in the sub-network.

SUMMARY OF THE INVENTION

According to an embodiment, a method for application broadcast forwarding for routers running redundancy protocols in a network is provided. The network includes a first router running at least one program instance of a redundancy protocol at one interface, and a second router running at least one program instance of the redundancy protocol at one interface. A relay agent is enabled on both the first and second routers. The method includes, for each router, determining at least one preference ID for the router, determining a broadcast ID of each incoming broadcast packet, matching the broadcast ID of the incoming broadcast packet with the at least one preference ID of the router, and relaying the incoming broadcast packet from a first network domain to a second network domain if the broadcast ID of the incoming broadcast packet matches one preference ID of the router.

BRIEF DESCRIPTION OF THE DRAWINGS

The embodiments of the invention will be better understood in view of the following drawings and the detailed description.

DETAILED DESCRIPTION OF THE INVENTION

An embodiment will be described using Virtual Router Redundancy Protocol (VRRP) as the redundancy protocol and the Dynamic Host Configuration Protocol (DHCP) as the application broadcast forwarding service. It should be noted that it is possible to use other redundancy protocols such as the Hot Standby Routing Protocol (HSRP) by Cisco or the XLRouter Redundancy Protocol (XRRP) by Hewlett-Packard. Other application broadcast forwarding services, such as TIME Protocol (TIMEP), may be used instead of DHCP.

VRRP is an internet standard for providing router redundancy in a network. The VRRP introduces the concept of a virtual router in a network. The virtual router is an abstract router object managed by the VRRP, and includes two or more routers running VRRP, known as VRRP routers. The VRRP specifies an election protocol that dynamically assigns the routing responsibility of the virtual router to one of the VRRP routers in the network. The VRRP router with the routing responsibility is called the Master, and assumes the responsibility of forwarding packets sent to the IP address associated with the virtual router and answering ARP requests for this IP address.

When the Master becomes unavailable, one of the other VRRP routers will assume the routing responsibility of the virtual router and forward packets sent to the IP address of the virtual router. This is known as the VRRP failover. Therefore, the VRRP ensures continuity of service in event of failures by providing redundancy for critical routers in the network. When the Master becomes available again, it takes over the routing responsibility of the virtual router from the other VRRP router immediately. This is known as the VRRP failback.

Figure 1:
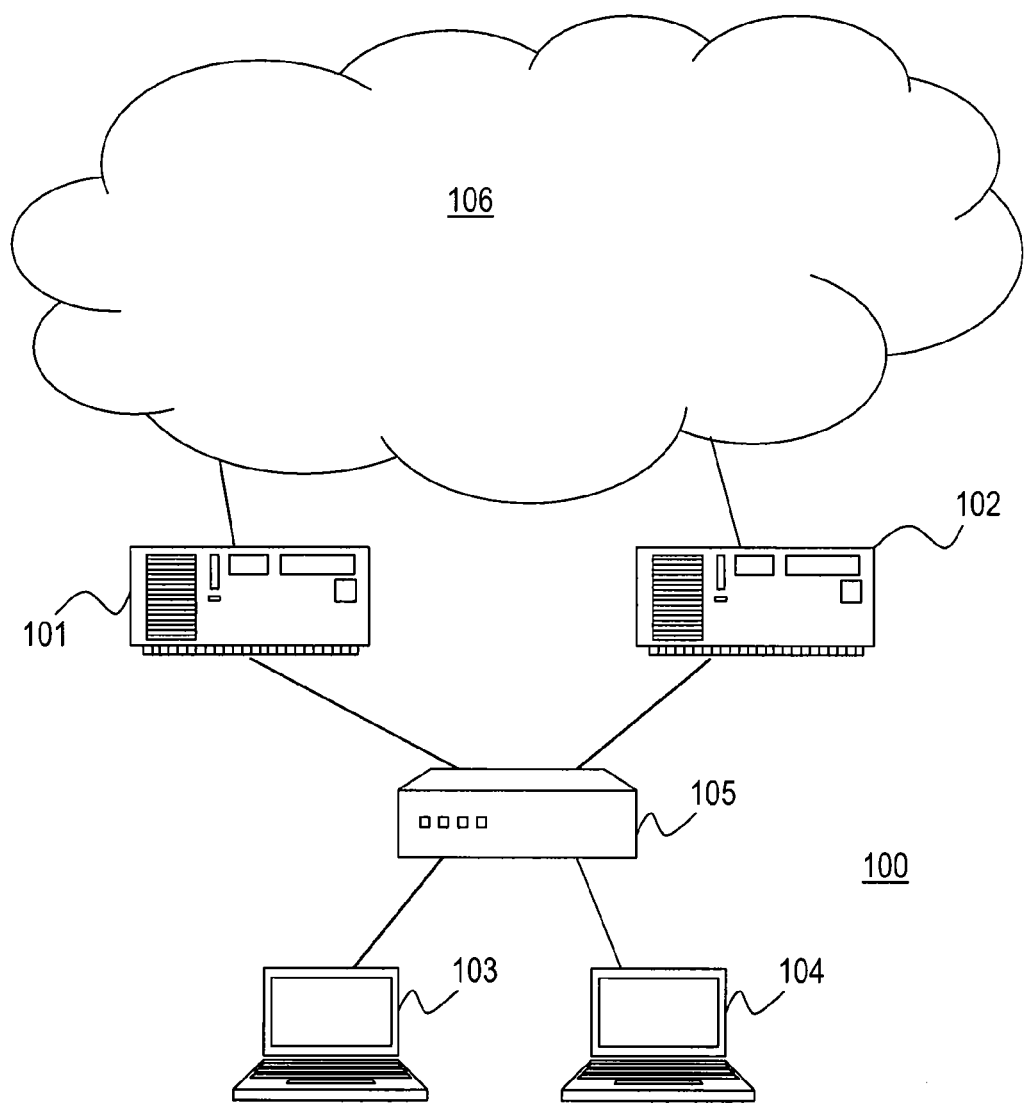
FIG. 1 shows an example of a typical network implementing VRRP on a pair of routers as a gateway for one or more hosts.

FIG. 1 shows an example of a typical network 100 implementing VRRP on a pair of routers 101, 102. The network 100 includes the pair of VRRP routers 101, 102, a switch 105 and other parts of the network represented by a network cloud 106. Two hosts 103, 104 are connected to the network 100 through the switch 105. The hosts 103, 104 include notebooks, personal computers (PC) or any computing devices which a user may use to access the network 100. Each VRRP router 101, 102 has at least one interface running an VRRP instance. An VRRP instance is a VRRP program implementing VRRP on the router.

One of the VRRP routers 101, 102 of the virtual router is designated as the Master. The VRRP router designated as the Master functions in a master state, and performs the routing function for the virtual router. The Master is associated with an IP address of the virtual router. Accordingly, any packets sent to the IP address of the virtual router are sent to the Master, and the Master assumes the responsibilities of forwarding these packets and answering ARP requests for this IP address. When the IP address of the virtual router is configured as a real IP address on the interface of the Master running the VRRP instance, the Master is also known as the IP Address Owner.

The other VRRP router is known as a Backup and functions in a backup state. When the Master loses connectivity to the network, for example due to device failure or taken down for maintenance, the Master "fails over" to the Backup. In other words, the Backup transitions to the master state, takes over the IP address of the virtual router, and assumes the responsibilities of forwarding packets and answering ARP requests for this IP address. When the Backup has transitioned to the master state, it has become the owner of the virtual router. In this manner, the Backup provides redundancy to the Master, and the reliability of the gateway service for the hosts 103, 104 is ensured.

The switch 105 forwards packets from the hosts 103, 104 to the VRRP router in the master state (Master) and from the Master to the hosts 103, 104. During a failover where the VRRP router in the backup state (Backup) takes over the IP address of the virtual router, the switch 105 forwards packets from the hosts 103, 104 to the Backup and from the Backup to the hosts 103, 104.

In the example network shown in FIG. 1, the VRRP routers 101, 102 are used to implement two virtual routers: VRID-1 and VRID-2. Each of the VRRP routers 101, 102 runs a first VRRP instance VI-1 and a second VRRP instance VI-2 on a first and second interface on a same network segment, respectively. The VRRP instance VI-1 of the VRRP router 101 functions in the master state for the virtual router VRID-1 and the VRRP instance VI-2 of the VRRP router 101 functions in the backup state for the virtual router VRID-2. Similarly, the VRRP instance VI-1 of the other VRRP router 102 functions in the backup state for the virtual router VRID-1 and the VRRP instance VI-2 of the VRRP router 102 functions in the master state for the virtual router VRID-2.

During the operation of the VRRP, the VRRP instance VI-1 in the VRRP router 101 sends multicast packets to inform that it is the Owner for the virtual router VRID-1. The VRRP instance VI-2 in the VRRP router 102 also sends multicast packets to inform that it is the Owner for the virtual router VRID-2. The VRRP instances in the backup state listen for such multicast packets. The hosts 103, 104 may be configured to send unicast packets to either one of the two virtual routers VRID-1, VRID-2 as their default gateway. For example, host 103 is configured to use VRID-1 as its default gateway, and hence sends unicast packets to the VRRP router 101. Host 104 is configured to use VRID-2 as its default gateway, and hence sends unicast packets to the VRRP router 102.

If the VRRP router 101 fails and loses connectivity to the network 100, the VRRP instance VI-1 at the VRRP router 102 does not receive any multicast packets from the VRRP instance VI-1 at the VRRP router 101. After a preconfigured time interval of not receiving any multicast packets from the VRRP router 101, the VRRP instance VI-1 at the VRRP router 102 assumes that the VRRP router 101 has failed. The VRRP instance VI-1 at the VRRP router 101 failovers to the VRRP instance VI-1 at VRRP router 102. Accordingly, the VRRP instance VI-1 at the VRRP router 102 transitions to the master state for the virtual router VRID-1. After the failover, the VRRP instance VI-1 at the VRRP router 102 starts sending its own multicast packets to inform that it is now the owner of the virtual router VRID-1. In addition to supporting the default gateway functionality for the host 104, VRRP router 2 now also provide default gateway functionality for the host 103.

When the VRRP router 101 restores its connectivity to the network 100, it takes over the responsibilities for packets forwarding and answering ARP requests of the virtual router VRID-1 from the VRRP instance VI-1 at the VRRP router 102 (by transitioning to the master state).

DHCP is a standard protocol to assign network configuration parameters such as IP addresses, subnet masks and default gateways to a new host connected to a network. It is based on the Bootstrap Protocol (BOOTP). When a host is connected to a DHCP-enabled network, it sends out a broadcast discovery message to find an appropriate DHCP server. The broadcast discovery message is a lease request. The DHCP server, upon receiving the lease request from the DHCP client, sends a DHCP Offer message to the DHCP client. This message contains information such as an IP address for lease to the DHCP client and lease duration of that IP address. If the DHCP client receives and accepts the IP lease from the DHCP server, it will send another broadcast message indicating that it has accepted the lease of the IP address. When the DHCP server receives the broadcast message indicating the acceptance of the lease of the IP address by the DHCP client, it sends an acknowledgement message and the DHCP process is complete.

Figure 2:
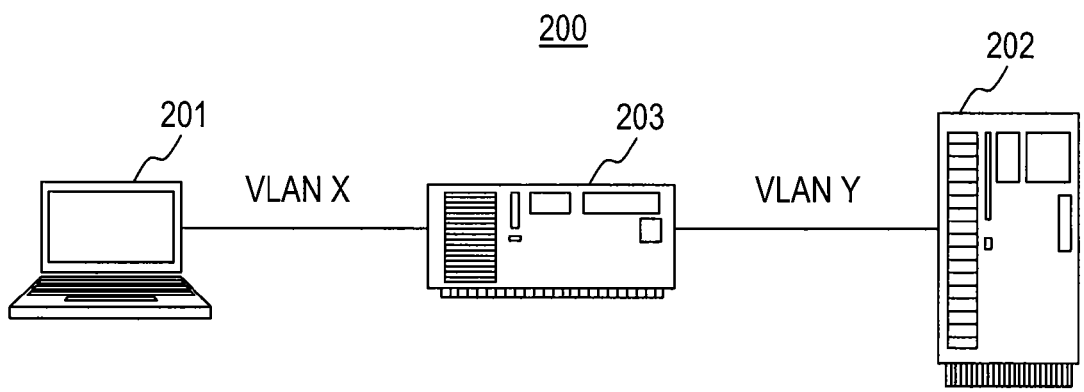
FIG. 2 shows an example of a typical network implementing DHCP using a DHCP relay agent.

FIG. 2 shows an example of a typical network implementation of DHCP using a DHCP relay agent. The network 200 includes a DHCP client 201, a DHCP server 202 and a router 203. The DHCP client 201 is connected to a Virtual Local Area Network (VLAN) VLAN X, and the DHCP server 202 resides on another VLAN, VLAN Y. When the DCHP client 201 is connected to VLAN X, it starts sending broadcast discovery messages requesting necessary network configuration information from a DHCP server 202. However, the DHCP server 202 resides in VLAN Y, which is a different LAN where the DHCP client 201 is connected to. Therefore, the broadcast message from the DHCP client 201 in VLAN X is not able to reach the DHCP server 202 in VLAN Y as broadcast messages typically do not cross router interfaces.

The router 203 in FIG. 2 is configured as a DHCP relay agent to relay DHCP broadcast messages from VLAN X to VLAN Y. Accordingly, the router 203 intercepts the broadcast discovery message from the DHCP client 201 and sends it to the DHCP server 202 as a unicast message. The router 203 then receives the DHCP Offer message from the DHCP server 202 and sends it to the DHCP client 201 as a broadcast message. Subsequently, the router 203 relays the broadcast message from the DHCP client 201 to the DHCP server 202 indicating the acceptance by the client 201 of the lease of the IP address. Finally, the router 203 relays the acknowledgement message from the DHCP server 202 to the DHCP client 201. The router 203 which is being configured as the DHCP relay agent thus allows a DHCP client to obtain an IP address even though the DHCP server is physically located in a different network segment or LAN from the DHCP client.

Figure 3:
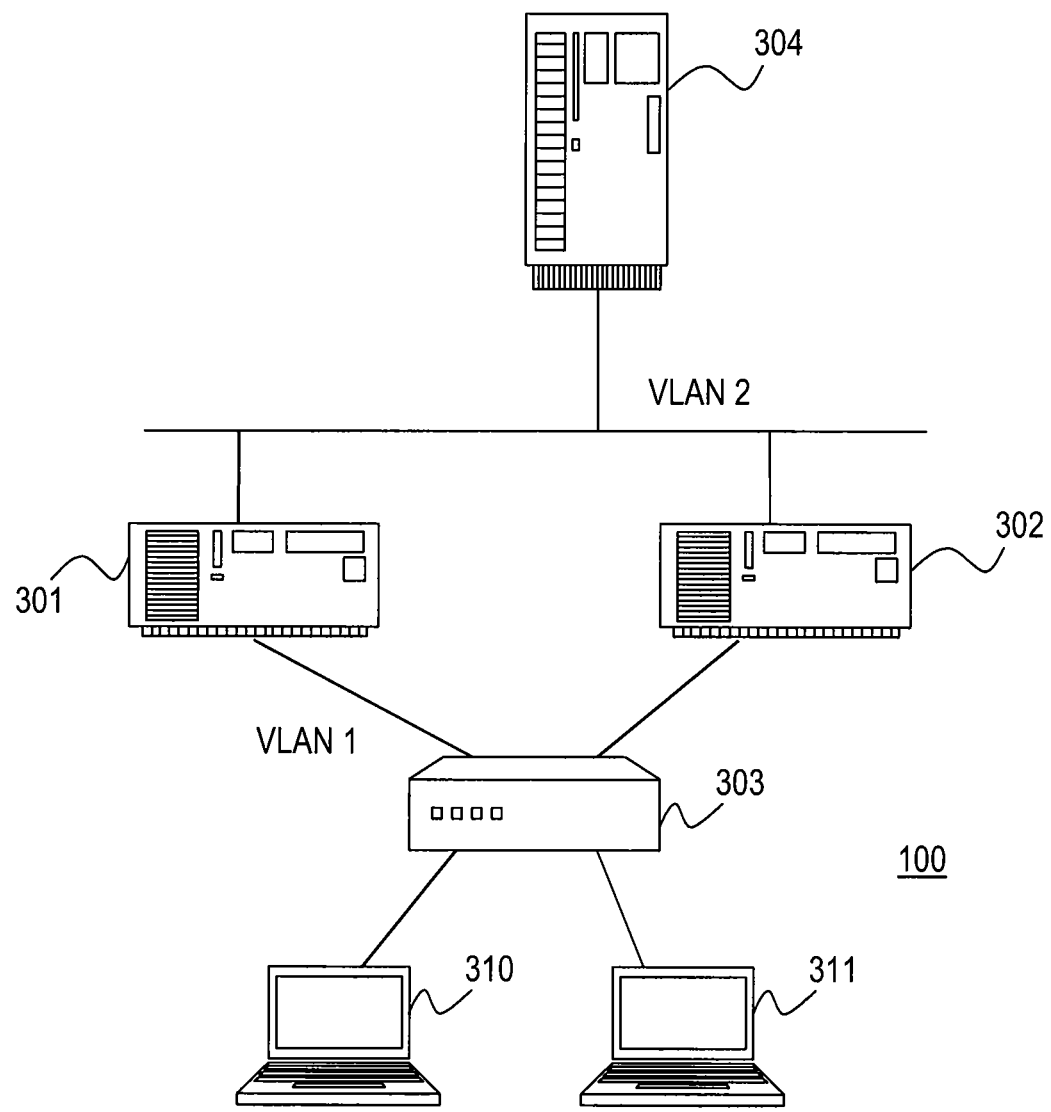
FIG. 3 shows an example of a network implementing DHCP relay operation in a VRRP environment according to an embodiment.

FIG. 3 shows an example of a network implementing DHCP relay operation in a VRRP environment according to an embodiment. The network 300 includes a first VRRP router 301, a second VRRP router 302, a switch 303, a DHCP server 304, a first network segment VLAN 1 and a second network segment VLAN 2. A first host 310 and a second host 311 are connected to the network 300 via the switch 303. Both the first and second hosts 310, 311 are DHCP clients. The first VRRP router 301, the second VRRP router 302 and the switch 303 are on VLAN 1. The DHCP server 304 is on VLAN 2. Both the VRRP routers 301, 302 are also configured as DHCP relay agents to relay DHCP broadcast messages from VLAN 1 to VLAN 2.

Similar to the example in FIG. 1, the VRRP routers 301, 302 in the example in FIG. 3 function as two virtual routers: VRID-1 and VRID-2. The virtual routers function as default gateway to VLAN 2 for the hosts 310, 311 connected to VLAN 1. Each of the VRRP routers 301, 302 runs a first VRRP instance VI-1 and a second VRRP instance VI-2 on a first and second interface in VLAN 1, respectively. The VRRP instance VI-1 of the VRRP router 301 functions in the master state for the virtual router VRID-1 and the VRRP instance VI-2 of the VRRP router 301 functions in the backup state for the virtual router VRID-2. Similarly, the VRRP instance VI-1 of the other VRRP router 302 functions in the backup state for the virtual router VRID-1 and the VRRP instance VI-2 of the VRRP router 302 functions in the master state for the virtual router VRID-2.

The first host 310 is configured to use the virtual router VRID-1 as the default gateway, and the second host 311 is configured to use the virtual router VRID-2 as the default gateway. When the first host 310 is connected to VLAN 1, the switch forwards any unicast packets from the first host 310 to the first VRRP router 301 to be forwarded to other network segments. Similarly, when the second host 311 is connected to VLAN 1, the switch forwards any unicast packets from the second host 311 to the second VRRP router 301 to be forwarded to other network segments.

The hosts 310, 311, when connected to the network segment VLAN 1, will also send broadcast discovery packets to attempt to locate an appropriate DHCP server in order to obtain an IP address. Without an arbitration scheme to ensure that only one router will relay the broadcast packets to the DHCP server 302, these broadcast packets will be picked up by both VRRP routers 301, 302 and relayed to the DHCP server 302 on VLAN 2. This results in the DHCP server 302 receiving two requests from each of the same hosts 310, 311. The DHCP server 302 will also respond to each of those requests, even though they are in duplicate, further resulting in unnecessary bandwidth consumption.

Figure 4:
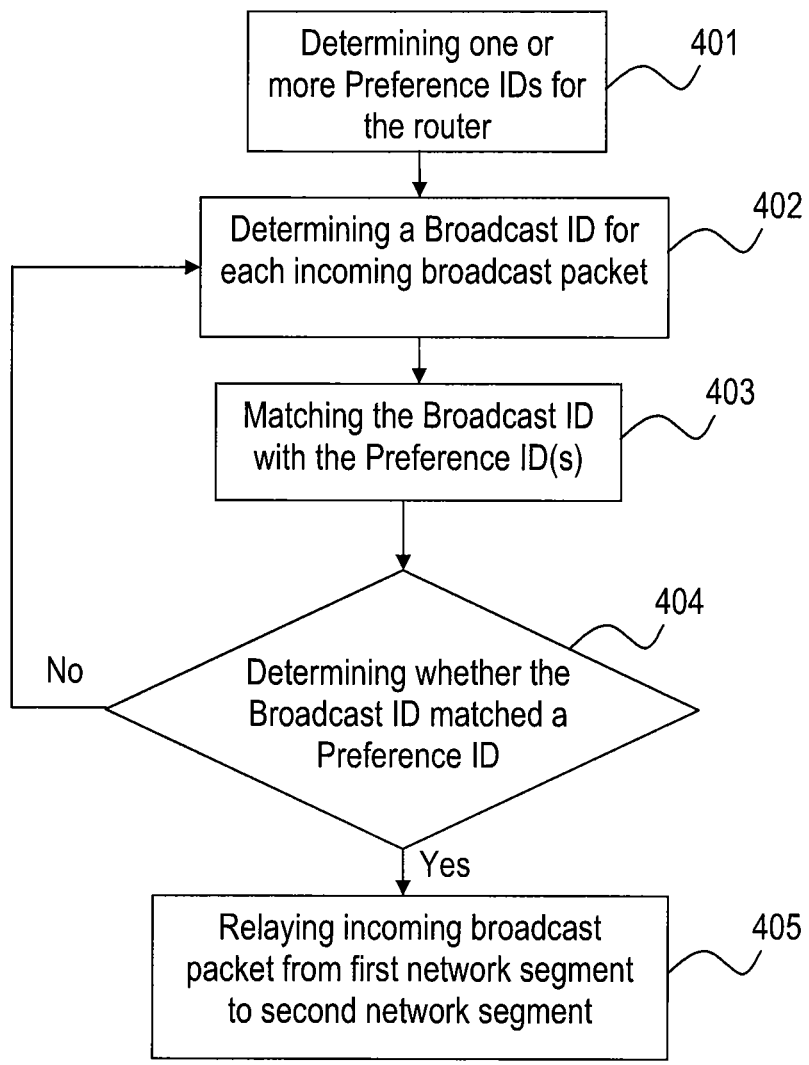
FIG. 4 shows a flow-chart of a method of application broadcast forwarding in the VRRP environment of FIG. 3 according an embodiment.

FIG. 4 shows a flow-chart of a method to determine which router in a VRRP environment relays a DHCP broadcast message to a DHCP server in another network segment according to an embodiment. The steps of the method will be described with reference to the network implementing DHCP relay operation in the VRRP environment as shown in FIG. 3. This method of FIG. 4 is performed by each of the VRRP routers 301, 302.

Step 401 includes determining one or more Preference ID for the router 301, 302. The determining of the Preference ID(s) will be described in greater detail later with reference to FIG. 5. Step 402 includes determining a broadcast ID for each incoming broadcast packet. If the VRRP router 301, 302 has been configured as a relay agent for multiple applications that require broadcast forwarding, the incoming broadcast packets would most likely have different UDP destination port numbers corresponding to different applications. The UDP destination port number of each incoming broadcast packet may be used to compute the Broadcast ID for that incoming broadcast packet.

Alternatively, the Broadcast ID may be computed using source MAC address of the incoming broadcast packet or a portion thereof (for example, a last byte of the source MAC address). The use of the source MAC address for determining the Broadcast ID may be more appropriate when the VRRP router 301, 302 has been configured as a relay agent for only one application that requires a broadcast forwarding capability. In such a case, the UDP destination port number of the incoming broadcast packets would be the same.

The Broadcast ID may be computed using a modulo function on the UDP destination port number or the portion of the source MAC address. The Broadcast ID is a number between 1 and the total number of virtual routers, n, implemented by the VRRP as the default gateway to the network segment where the DHCP server 304 is located. To ensure that the Broadcast ID is always between 1 and n, the following expression may be used:

$$i.\ z = (a \bmod n) + 1 \tag{1}$$

where z is the Broadcast ID, a is the UDP destination port number or the last byte of the source MAC address, mod is the modulo function, and n is the total number of virtual routers. Therefore, if the UDP destination port number a of an incoming broadcast packet is 1494 and the total number of virtual routers n is 2, the Broadcast ID z would be 1 according to the above expression.

Step 403 includes matching the Broadcast ID of the incoming broadcast packet with the Preference ID(s) of the VRRP router 301, 302. If it is determined at Step 404 that the Broadcast ID of the incoming broadcast packet matches a Preference ID of the VRRP router 301, 302, the VRRP router 301, 302 will relay the broadcast packet to VLAN 2 where the DHCP server 304 is located at Step 405. Otherwise, the incoming broadcast packet is ignored by the VRRP router 301, 302 and the Broadcast ID of a next incoming broadcast packet is determined at Step 402.

Therefore, if VRRP router 301 has a Preference ID 1 and the VRRP router 302 has a Preference ID 2, the VRRP router 301 will only relay incoming broadcast packets having a Broadcast ID 1 and VRRP router 302 will only relay incoming broadcast packets having a Broadcast ID 2. Accordingly, only one VRRP router will forward a given broadcast discovery message from a DHCP client to the DHCP server, preventing duplication of requests and unnecessary bandwidth consumption according to the embodiment. Also, if the VRRP routers have been configured as relay agents for multiple applications that require broadcast forwarding, the Broadcast IDs of the incoming broadcast packets are generated using the UDP destination port numbers. Since different VRRP routers have their own different Preference IDs, different broadcast packets will be forwarded by different VRRP routers depending on their UDP destination port numbers, thereby achieving load sharing of network traffic based on the application that requires broadcast forwarding.

If the VRRP router 301, 302 is configured as relay agent for multiple applications that require broadcast forwarding and also knows its Preference ID, it can be further configured to filter incoming broadcast packets with UDP destination port numbers which do not match its Preference ID. This filtering may be performed at a lower Data Link Layer (Layer 2 of the OSI Model) instead of the Transport Layer (Layer 4 of the OSI Model) using special software or hardware filters. For example, an Access Control Lists (ACLs) may be used to implement such a hardware filter. Accordingly, such incoming broadcast packets can be filtered at the hardware layer, and need not be processed by the CPU. This helps to reduce the CPU load of the router.

Figure 5:
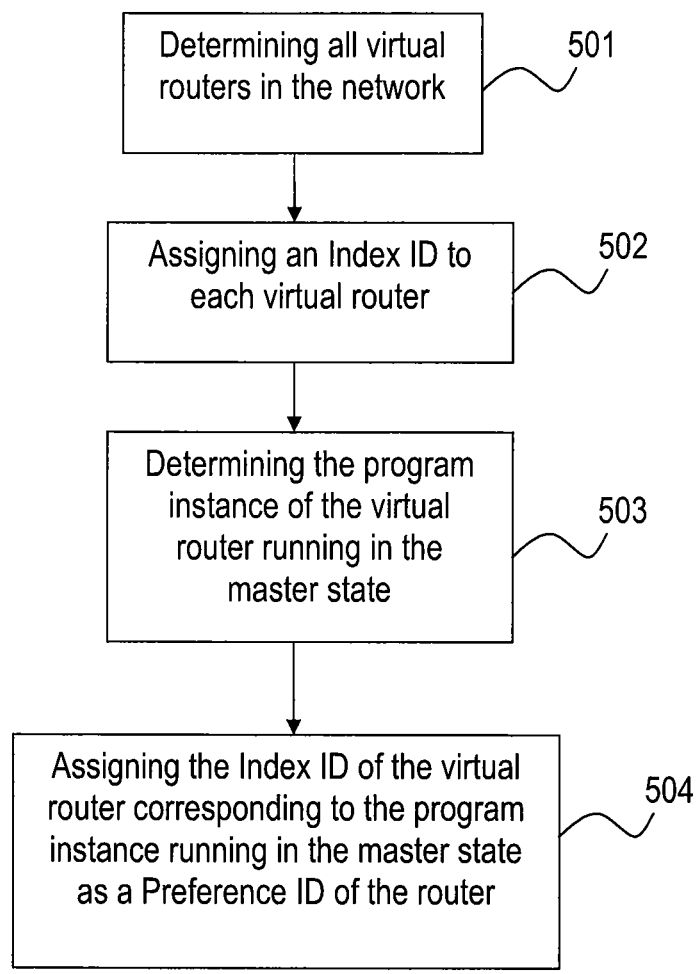
FIG. 5 shows a flow-chart of a method of determining a Preference ID for each router according to an embodiment.

FIG. 5 shows a flow-chart of a method for determining the Preference ID of a VRRP router according to an embodiment. The steps of this method will also be described with reference to the network implementing DHCP relay operation in the VRRP environment as shown in FIG. 3.

Step 501 includes determining all virtual routers configured by the VRRP in the network. These virtual routers serve as default gateways to the other network segment where the DHCP server is located. With reference to the network in FIG. 3, this corresponds to VRID-1 and VRID-2 on the VRRP routers 301, 302.

Step 502 includes assigning an Index ID to each of the virtual routers determined in step 501. In an embodiment, the virtual routers may be sorted prior to assigning the Index IDs. For example, the virtual routers may be sorted in an ascending order. Accordingly, VRID-1 is assigned Index ID 1 and VRID-2 is assigned Index ID 2. Alternatively, the virtual routers may be sorted in a descending order. Accordingly, VRID-2 and VRID-1 are assigned an Index ID of 1 and 2, respectively.

Step 503 includes determining the VRRP instance of the virtual router which is running in a master state at the router. At the VRRP router 301, the VRRP instance of the virtual router VRID-1 is running in the master state. At the VRRP router 302, the VRRP instance of the virtual router VRID-2 is running in the master state. Step 504 includes assigning the Index ID of the virtual router corresponding to the VRRP instance running in the master state at the VRRP router as a Preference ID of the VRRP router. Since the VRRP instance of the virtual router VRID-1 is running in the master state at VRRP router 301, the Index ID of virtual router VRID-1 is assigned as the Preference ID for VRRP router 301. Accordingly, the Preference ID for VRRP router 301 is 1. The VRRP instance of the virtual router VRID-2 is running in the master state at VRRP router 302. The Index ID of the virtual router VRID-2 is assigned as the Preference ID for VRRP router 302. Accordingly, the Preference ID for VRRP router 302 is 2.

It should be noted that if there are multiple virtual routers with more than one VRRP instances of virtual routers running in a master state at a VRRP router, multiple Preference IDs may be assigned to the VRRP router. When there are any changes in the VRRP configuration and/or dynamic state, each VRRP router would re-determine its Preference ID according to Steps 501 to 504. Changes in the VRRP configuration and/or dynamic state include addition, deletion or modification of a virtual router, a VRRP router failing over, a new VRRP router taking over control of a virtual IP address, a VRRP instance transitioning between a master state and a backup state, etc.

For example if the VRRP router 301 shown in FIG. 3 fails, the VRRP instance of the virtual router VRID-1 running at VRRP router 302 transitions to the master state. Accordingly, both the VRRP instances at VRRP router 302 corresponding to VRID-1 and VRID-2 are running in the master state. At step 501, VRID-1 and VRID-2 are determined to be all the virtual routers in the network. These virtual routers VRID-1 and VRID-2 are assigned an Index ID of 1 and 2, respectively at Step 502. At step 503, both the VRRP instances at VRRP router 302 are determined to be running in the master state. At step 504, both the Index IDs 1, 2 are assigned as the Preference IDs of the VRRP router 302. Accordingly, the VRRP router 302 now has 2 Preference IDs, and will relay incoming broadcast packets having both Broadcast IDs 1 and 2. As can be seen from this example, both the VRRP routers 301, 302 also operate in such a manner so as to provide backup for the application broadcast forwarding functionality if one of them fails.

The network shown in FIG. 3 was a symmetrically backed up VRRP routers, in which each VRRP router was symmetrically backed up by another VRRP router. In other words, each VRRP router is configured with all the virtual routers in the network with some VRRP instances of the virtual routers operating in the master state and others operating in the backup state. Each VRRP router therefore has information of all the virtual routers in the network. The method described in FIG. 5 may also be used to determine one or more Preference IDs for routers in a VRRP environment where the network is asymmetrically backed up. For example, a VRRP router may be configured as Owner for multiple virtual routers, but is backed up by multiple VRRP routers in such a way that not all VRRP routers are configured with the same set of virtual routers. An example of asymmetrically backed up VRRP routers is shown in FIG. 6.

Figure 6:
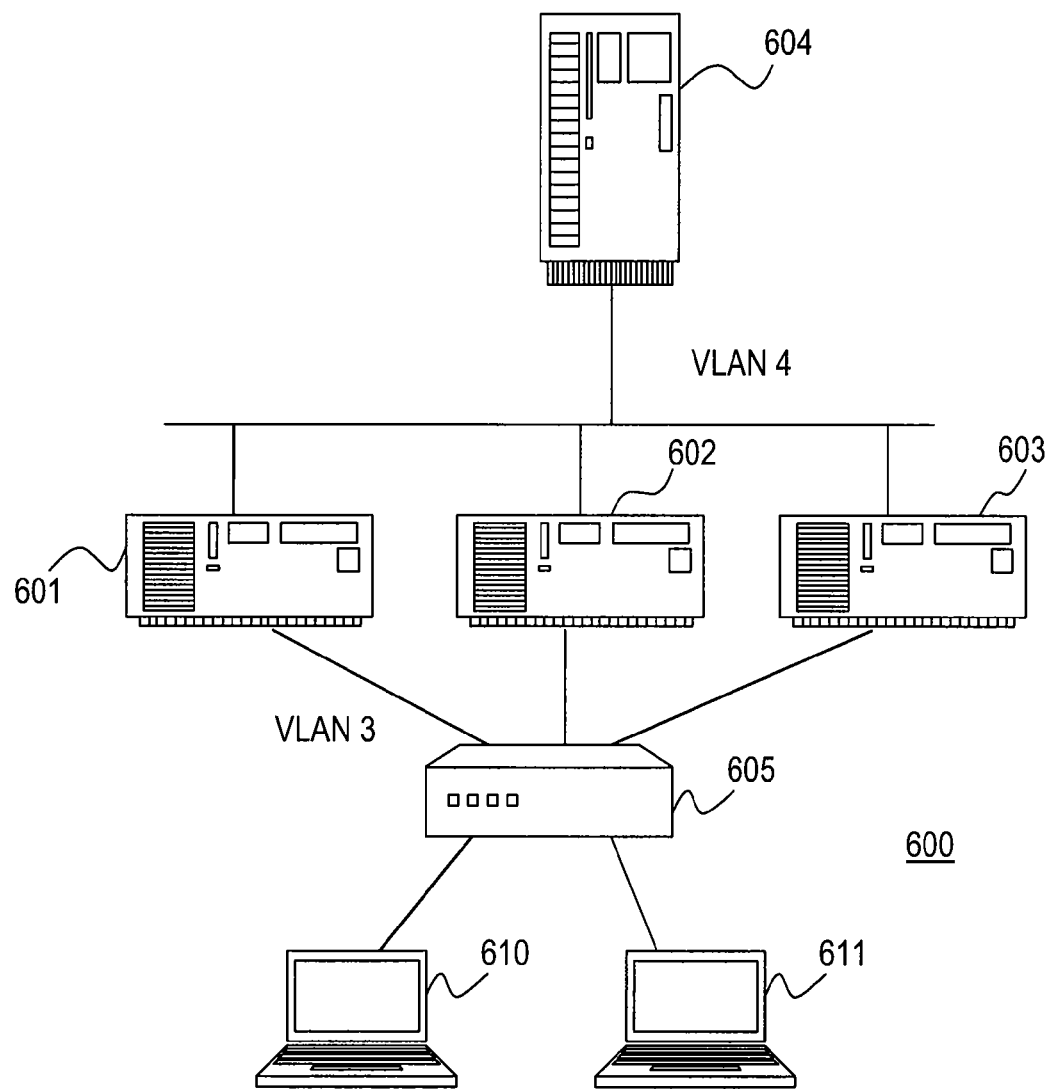
FIG. 6 shows an example of an asymmetrical network implementing DHCP relay operation in a VRRP environment according to another embodiment.

FIG. 6 shows an example of a network 600 implementing DHCP relay operation in VRRP environment having asymmetrically backed up VRRP routers according to an embodiment. The network 600 includes a first VRRP router 601, a second VRRP router 602, a third VRRP router 603, a DHCP server 604 and a switch 605. The VRRP routers 601, 602, 603 and the switch 303 are on network segment VLAN 3. DHCP clients or hosts 610, 611 are connected to VLAN 3 via the switch 605. The DHCP server 304 is on network segment VLAN 4. The VRRP routers 601, 602, 603 are configured as DHCP relay agents to relay DHCP broadcast messages from VLAN 3 to VLAN 4.

The VRRP routers 601, 602, 603 are configured as two virtual routers VRID-3, VRID-4 to provide default gateway from VLAN 3 to VLAN 4. The first VRRP router 601 is configured as the Owner of both virtual IP addresses of the two virtual routers VRID-3, VRID-4. In other words, both VRRP instances on the first VRRP router 601 are running in the master state. The second VRRP router 602 is configured to back up the first VRRP router 601 for the virtual router VRID-3. The third VRRP router 603 is configured to back up the first VRRP router 601 for the virtual router VRID-4. Therefore, the VRRP instance on both the second and third VRRP routers 602, 603 are running in the backup state. If VRRP router 601 fails, the VRRP instance on VRRP router 602 transitions to master state to back up the first VRRP router 601 for virtual router VRID-3 and the VRRP instance on VRRP router 603 transitions to master state to back up the first VRRP router 601 for virtual router VRID-4.

In this network 600 with asymmetrically backed up VRRP routers, the second and third VRRP routers 602, 603 do not have information of all the virtual routers. In particular, the second VRRP router 602 only have information on the virtual router VRID-3, and the third VRRP router 603 only have information on the virtual router VRID-4. According to the VRRP protocol, the VRRP instance in the master state will send out multicast advertisements to the other VRRP instances in the other VRRP routers to inform them that it is the current Owner. According to an embodiment, the VRRP routers 602, 603 receive these multicast advertisements and determine all the virtual routers information based on the received multicast advertisements.

Specifically, the VRRP router 602 only has information on virtual router VRID-3. Upon receiving multicast advertisements regarding virtual routers VRID-3 and VRID-4 from the VRRP instances on VRRP router 601, it also obtain information on VRID-4. Similarly, the VRRP router 603 only has information on virtual router VRID-4. Upon receiving multicast advertisements from the VRRP instances on VRRP router 601, it also obtain information on VRID-3. Once the information on all the virtual routers in the network 600 have been obtained, each VRRP router 601, 602, 603 may proceed to determine the Preference ID according to the method described in FIG. 5.

It should be noted that although the embodiments shown in FIG. 3 to FIG. 6 were described with reference to the DHCP and VRRP, the embodiments are not limited to using DHCP and VRRP as the protocols to obtain network infrastructure information and to provide router redundancies. Other types of protocols may be used in this embodiment. Examples of other application protocols that require broadcast forwarding include TFTP (Trivial File Transfer Protocol), TIMEP, DNS, TACACS, NetBios, etc. Examples of router redundancy protocols include VRRP, HP-XRRP and Cisco-HSRP.

The embodiments described above allow efficient operation of any application broadcast forwarding service in a network that requires redundancy, thereby combining the benefits of both of these features. The described embodiments enable efficient utilization of network bandwidth by preventing duplication of requests sent by hosts/clients and responses sent by servers. In addition, the availability of application broadcast forwarding service is also ensured in the event of failure of the primary default gateway. Load sharing of application broadcast forwarding functionality across all available routers is also provided, ensuring that no single router is overloaded with broadcast forwarding requests from the hosts.

Although the present invention has been described in accordance with the embodiments as shown, one of ordinary skill in the art will readily recognize that there could be variations to the embodiments and those variations would be within the spirit and scope of the present invention. Accordingly, many modifications may be made by one of ordinary skill in the art without departing from the spirit and scope of the appended claims.

What is claimed:

1. A method for application broadcast forwarding for routers running redundancy protocols in a network, the network comprising a first router running at least one program instance of a redundancy protocol at one interface, and a second router running at least one program instance of the redundancy protocol at one interface, wherein a relay agent is enabled on both the first and second routers, the method comprising:

receiving, by the first router and the second router, a same broadcast packet; and determining, by each of the first router and the second router, whether the first router or the second router is to relay the received broadcast packet, wherein the determining includes, by each of the first router and the second router:

determining at least one preference ID for one of the first and second routers;

determining a broadcast ID of the received broadcast packet;

matching the broadcast ID of the received broadcast packet with the at least one preference ID; and relaying the received broadcast packet from a first network domain to a second network domain in response to the broadcast ID of the received broadcast packet matching the at least one preference ID.

2. The method of claim 1, wherein determining the at least one preference ID comprises:

determining a plurality of virtual router instances in the first network domain providing router redundancy;

assigning an Index ID to each of the determined virtual router instances;

determining at least one program instance of redundancy protocol running at one of the first and second router in a master state; and assigning the Index ID of one of the virtual router instances corresponding to the at least one program instance of redundancy protocol running in the master state as the preference ID.

3. The method of claim 2, further comprising sorting the virtual router instances in a predefined order prior to assigning the Index ID to each of the determined virtual router instances.

4. The method of claim 2, further comprising re-determining the at least one preference ID for each of the first router and the second router when there is at least one of a redundancy protocol configuration and a dynamic state change in any of the first and second routers running the at least one program instance of the redundancy protocol.

5. The method of claim 2, wherein determining the plurality of virtual router instances in the first network domain providing router redundancy comprises:

receiving multicast advertisement frames from the at least one program instance of redundancy protocol running on the other routers in the first network domain; and determining the plurality of virtual router instances based on the received multicast advertisement frames.

6. The method of claim 1, wherein determining a broadcast ID of the received broadcast packet comprises:

determining a User Data Protocol (UDP) destination port number in the received broadcast packet; and determining the broadcast ID based on the UDP destination port number.

7. The method of claim 6, further comprising filtering, by each of the first router and the second router, incoming broadcast packets with broadcast IDs which do not match the at least one preference ID using software or hardware filtering.

8. The method of claim 7, further comprising filtering, by each of the first router and the second router, incoming broadcast packets with broadcast IDs which do not match the at least one preference ID using a hardware filter implemented using an Access Control List.

9. The method of claim 1, wherein determining a broadcast ID of the received broadcast packet comprises:
determining a source MAC address of the received broadcast packet; and
determining the broadcast ID based on at least a portion of the source MAC address.

10. A virtual router system comprising:
a first router running at least one program instance of a redundancy protocol at one interface; and
a second router running at least one program instance of the redundancy protocol at one interface,
wherein a relay agent is enabled on both the first and second routers,
wherein each of the first router and the second router is to receive a same broadcast packet and determine whether the first router or the second router is to relay the received broadcast packet, and
wherein, to determine whether the first router or the second router is to relay the received broadcast packet, each of the first router and the second router is to:
determine at least one preference ID for one of the first and second routers;
determine a broadcast ID of the received broadcast packet;
match the broadcast ID of the received broadcast packet with the at least one preference ID; and
relay the received broadcast packet from a first network domain to a second network domain in response to the broadcast ID of the received broadcast packet matching the at least one preference ID.

11. The virtual router system of claim 10, wherein each of the first router and the second router is further to:
determine a plurality of virtual router instances in the first network domain providing router redundancy;
assign an Index ID to each of the determined virtual router instances;
determine at least one program instance of the redundancy protocol running at one of the first and second router in a master state; and
assign the Index ID of one of the virtual router instances corresponding to the at least one program instance of redundancy protocol running in the master state as the preference ID.

12. The virtual router system of claim 11, wherein each of the first router and the second router is further to re-determine the at least one preference ID when there is at least one of a redundancy protocol configuration and a dynamic state change in any of the first and second routers running the at least one program instance of the redundancy protocol.

13. The virtual router system of claim 11, wherein each of the first router and the second router is further to:
receive multicast advertisement frames from program instances of redundancy protocol running on the other routers in the first network domain; and
determine the plurality of virtual router instances in the first network domain providing router redundancy based on the received multicast advertisement frames.

14. The virtual router system of claim 10, wherein each of the first router and the second router is to:
determine a User Datagram Protocol (UDP) destination port number in the received broadcast packet; and
determine the broadcast ID based on the UDP destination port number.

15. The virtual router system of claim 10, wherein each of the first router and the second router is to:
determine a source MAC address of the received broadcast packet; and
determine the broadcast ID based on a portion of the source MAC address.

* * * * *